(12) United States Patent
Wang et al.

(10) Patent No.: US 9,699,808 B2
(45) Date of Patent: Jul. 4, 2017

(54) APPARATUS, SYSTEM, AND METHOD FOR ACCESS PROCEDURE ENHANCEMENTS

(71) Applicant: Intel Corporation, Santa Clara, CA (US)

(72) Inventors: Guotong Wang, Beijing (CN); Jian Gu, Fremont, CA (US); Anthony Lee, San Diego, CA (US); Shu Wang, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/675,950

(22) Filed: Apr. 1, 2015

(65) Prior Publication Data
US 2015/0208437 A1    Jul. 23, 2015

Related U.S. Application Data

(62) Division of application No. 12/875,391, filed on Sep. 3, 2010, now Pat. No. 9,025,572.

(Continued)

(51) Int. Cl.
| | |
|---|---|
| *H04W 74/00* | (2009.01) |
| *H04W 52/34* | (2009.01) |
| *H04W 52/48* | (2009.01) |
| *H04W 74/08* | (2009.01) |
| *H04L 5/00* | (2006.01) |

(Continued)

(52) U.S. Cl.
CPC ......... *H04W 74/004* (2013.01); *H04L 5/0055* (2013.01); *H04W 28/0236* (2013.01); *H04W 28/06* (2013.01); *H04W 48/10* (2013.01); *H04W 52/343* (2013.01); *H04W 52/36* (2013.01); *H04W 52/48* (2013.01); *H04W 72/0486* (2013.01); *H04W 74/085* (2013.01); *H04W 52/04* (2013.01); *H04W 52/146* (2013.01); *H04W 52/221* (2013.01); *H04W 52/228* (2013.01); *H04W 52/325* (2013.01); *H04W 52/362* (2013.01); *H04W 52/367* (2013.01); *H04W 52/50* (2013.01); *H04W 52/54* (2013.01); *H04W 76/02* (2013.01)

(58) Field of Classification Search
None
See application file for complete search history.

(56) References Cited

U.S. PATENT DOCUMENTS

| | | |
|---|---|---|
| 5,544,196 A | 8/1996 | Tiedemann et al. |
| 5,884,196 A | 3/1999 | Lekven et al. |

(Continued)

FOREIGN PATENT DOCUMENTS

| | | |
|---|---|---|
| CN | 1527623 | 9/2004 |

*Primary Examiner* — Andrew Oh
(74) *Attorney, Agent, or Firm* — Schiff Hardin LLP (57) ABSTRACT

A service network for access procedure enhancement includes a radio access network performing wireless transmissions and receptions to and from a mobile communication device. The service network also includes a control node receiving an access probe from the mobile communication device via the radio access network, determining whether the access probe indicates that a length of message data is less than a threshold, and transmitting a pre-acknowledgement of the access probe to the mobile communication device via the radio access network in response to the length of the message data being less than the threshold.

12 Claims, 11 Drawing Sheets

Related U.S. Application Data (60) Provisional application No. 61/241,003, filed on Sep. 9, 2009, provisional application No. 61/239,763, filed on Sep. 3, 2009.

(51) Int. Cl.
  H04W 28/02 (2009.01)
  H04W 28/06 (2009.01)
  H04W 48/10 (2009.01)
  H04W 72/04 (2009.01)
  H04W 52/50 (2009.01)
  H04W 52/54 (2009.01)
  H04W 52/32 (2009.01)
  H04W 52/14 (2009.01)
  H04W 52/04 (2009.01)
  H04W 52/22 (2009.01)
  H04W 52/36 (2009.01)
  H04W 76/02 (2009.01)

(56) References Cited

U.S. PATENT DOCUMENTS

| | | | |
|---|---|---|---|
| 6,519,233 B1* | 2/2003 | Gutierrez | H04W 52/143 370/320 |
| 6,741,861 B2 | 5/2004 | Bender et al. | |
| 7,426,391 B2 | 9/2008 | Tiedemann et al. | |
| 7,489,941 B2* | 2/2009 | Nemethova | H04W 52/48 455/522 |
| 8,023,463 B2* | 9/2011 | Dick | H04L 1/16 370/331 |
| 8,095,166 B2 | 1/2012 | Sampath et al. | |
| 8,233,922 B2 | 7/2012 | Petrovic et al. | |
| 8,305,976 B1 | 11/2012 | Vargantwar et al. | |
| 8,379,606 B2 | 2/2013 | Kim et al. | |
| 8,599,734 B1* | 12/2013 | Ram | H04L 1/0002 370/312 |
| 8,804,548 B2* | 8/2014 | Lindskog | H04L 1/0002 370/252 |
| 9,071,344 B2* | 6/2015 | Smee | H04B 1/7107 |
| 2001/0021195 A1 | 9/2001 | Miller et al. | |
| 2002/0018450 A1 | 2/2002 | McKenna et al. | |
| 2003/0095572 A1* | 5/2003 | Efthymiou | H04L 1/0002 370/468 |
| 2004/0081115 A1 | 4/2004 | Parsa et al. | |
| 2004/0242231 A1 | 12/2004 | Tang et al. | |
| 2005/0111407 A1* | 5/2005 | Hosein | H04W 28/22 370/329 |
| 2005/0170781 A1 | 8/2005 | Jacobsen et al. | |
| 2005/0249133 A1* | 11/2005 | Terry | H04L 1/0025 370/278 |
| 2006/0018289 A1 | 1/2006 | Schulist et al. | |
| 2006/0018336 A1 | 1/2006 | Sutivong et al. | |
| 2006/0072503 A1* | 4/2006 | Kim | H04L 12/5693 370/329 |
| 2006/0077935 A1 | 4/2006 | Hamalainen | H04B 7/0408 370/334 |
| 2006/0084432 A1* | 4/2006 | Balasubramanian | H04W 74/004 455/434 |
| 2006/0109810 A1* | 5/2006 | Au | H04L 1/1819 370/328 |
| 2006/0176870 A1 | 8/2006 | Joshi et al. | |
| 2006/0218457 A1* | 9/2006 | Nakamori | H03M 1/1255 714/748 |
| 2006/0239239 A1 | 10/2006 | Yang | |
| 2006/0259846 A1* | 11/2006 | Bhushan | H03M 13/276 714/755 |
| 2006/0269024 A1 | 11/2006 | Dominique et al. | |
| 2007/0047580 A1 | 3/2007 | Sachs et al. | |
| 2007/0073895 A1* | 3/2007 | Sebire | H04L 47/10 709/230 |
| 2007/0076682 A1 | 4/2007 | Kim et al. | |
| 2007/0123291 A1 | 5/2007 | Mousley et al. | |
| 2007/0177556 A1 | 8/2007 | Chen | |
| 2007/0230394 A1* | 10/2007 | Wang | H04J 11/0069 370/328 |
| 2008/0084848 A1* | 4/2008 | Jard | H04W 52/143 370/332 |
| 2008/0096543 A1* | 4/2008 | Sundararajan | H04W 24/00 455/424 |
| 2008/0096563 A1* | 4/2008 | Fischer | H04L 1/0028 455/436 |
| 2008/0102878 A1 | 5/2008 | Tiedemann et al. | |
| 2008/0130588 A1* | 6/2008 | Jeong | H04W 74/002 370/335 |
| 2008/0224903 A1* | 9/2008 | Samuels | H03M 7/3084 341/51 |
| 2008/0225725 A1* | 9/2008 | Wang | H04L 47/10 370/235.1 |
| 2008/0227406 A1 | 9/2008 | Kludt et al. | |
| 2008/0228942 A1 | 9/2008 | Lor et al. | |
| 2008/0232234 A1 | 9/2008 | McCoy et al. | |
| 2008/0242337 A1 | 10/2008 | Sampath | |
| 2008/0254804 A1* | 10/2008 | Lohr | H04W 72/14 455/442 |
| 2008/0259855 A1* | 10/2008 | Yoon | H04L 1/1657 370/329 |
| 2008/0298325 A1 | 12/2008 | Vujcic | |
| 2009/0011786 A1 | 1/2009 | Lee et al. | |
| 2009/0016266 A1 | 1/2009 | Kim et al. | |
| 2009/0016273 A1 | 1/2009 | Kanterakis | |
| 2009/0052388 A1* | 2/2009 | Kim | H04W 74/002 370/329 |
| 2009/0175161 A1 | 7/2009 | Yi et al. | |
| 2009/0191887 A1* | 7/2009 | Goto | H04W 28/22 455/450 |
| 2009/0196275 A1* | 8/2009 | Damnjanovic | H04W 28/06 370/345 |
| 2009/0252119 A1 | 10/2009 | Fischer et al. | |
| 2009/0268666 A1* | 10/2009 | Vujcic | H04W 74/0866 370/328 |
| 2009/0274048 A1 | 11/2009 | Sambhwani et al. | |
| 2009/0280828 A1* | 11/2009 | Wang | H04W 64/00 455/456.1 |
| 2009/0316811 A1* | 12/2009 | Maeda | H04L 1/1671 375/260 |
| 2010/0020781 A1* | 1/2010 | Tayloe | H04W 28/22 370/342 |
| 2010/0034177 A1 | 2/2010 | Santhanam | |
| 2010/0041370 A1* | 2/2010 | Narasimha | H04W 74/008 455/410 |
| 2010/0067454 A1* | 3/2010 | Lee | H04W 52/322 370/329 |
| 2010/0067498 A1* | 3/2010 | Lee | H04W 74/006 370/336 |
| 2010/0069064 A1 | 3/2010 | Hannu et al. | |
| 2010/0111032 A1* | 5/2010 | Wu | H04W 74/0833 370/331 |
| 2010/0202575 A1* | 8/2010 | Farag | H04L 1/1845 375/346 |
| 2010/0222063 A1 | 9/2010 | Ishikura et al. | |
| 2010/0226267 A1 | 9/2010 | Jang et al. | |
| 2010/0265964 A1* | 10/2010 | Lindskog | H04L 1/0002 370/431 |
| 2010/0323736 A1 | 12/2010 | Fischer et al. | |
| 2011/0026409 A1 | 2/2011 | Hu et al. | |
| 2011/0035522 A1* | 2/2011 | Tan | G06F 13/28 710/107 |
| 2011/0051609 A1 | 3/2011 | Ishii et al. | |
| 2011/0223924 A1* | 9/2011 | Lohr | H04W 72/042 455/450 |

\* cited by examiner

APPARATUS, SYSTEM, AND METHOD FOR ACCESS PROCEDURE ENHANCEMENTS

CROSS REFERENCE TO RELATED APPLICATIONS

This application is a Divisional of pending U.S. patent application Ser. No. 12/875,391, filed on Sep. 3, 2010, which claims the benefit of U.S. Provisional Application No. 61/239,763, filed on Sep. 3, 2009, the entirety of which is incorporated by reference herein, and this application also claims the benefit of U.S. Provisional Applications No. 61/241,003, filed on Sep. 9, 2009, the entireties of which are incorporated by reference herein.

BACKGROUND OF THE INVENTION

Field of the Invention

The invention generally relates to control signaling over access channels in mobile communication systems, and more particularly, to access procedure enhancements for mobile communication systems.

Description of the Related Art

For a long time, various machines have been provided to make our lives more convenient in every way. Generally, machines, nowadays, are equipped with computing processors and software to accommodate us with more intelligence-based services. With the advancement of wireless communications, Machine-to-Machine (M2M) technology has been developed to enable communications between remote machines for exchanging information and operating without human interaction. Especially for critical public infrastructures, such as water treatment facilities or bridges, M2M sensors may be employed to monitor the operation statuses of facilities and report measurement results back to control centers via wireless communication networks, such as Global System for Mobile Communication/General Packet Radio Service (GSM/GPRS), Universal Mobile Telecommunication System (UMTS), 1× Code Division Multiple Access 2000 (1×CDMA 2000) system, 1× High Rate Packet Data (1×HRPD) system, and Long Term Evolution (LTE) system, etc. This would allow administrators of the critical public infrastructures to know if certain elements have been tampered with. Other applications may be electric meters, gas line monitoring devices, or coke machines that report their operation statuses to a centralized system via wireless communication networks, to provide related services with higher efficiency and lower maintenance costs.

Figure 1:
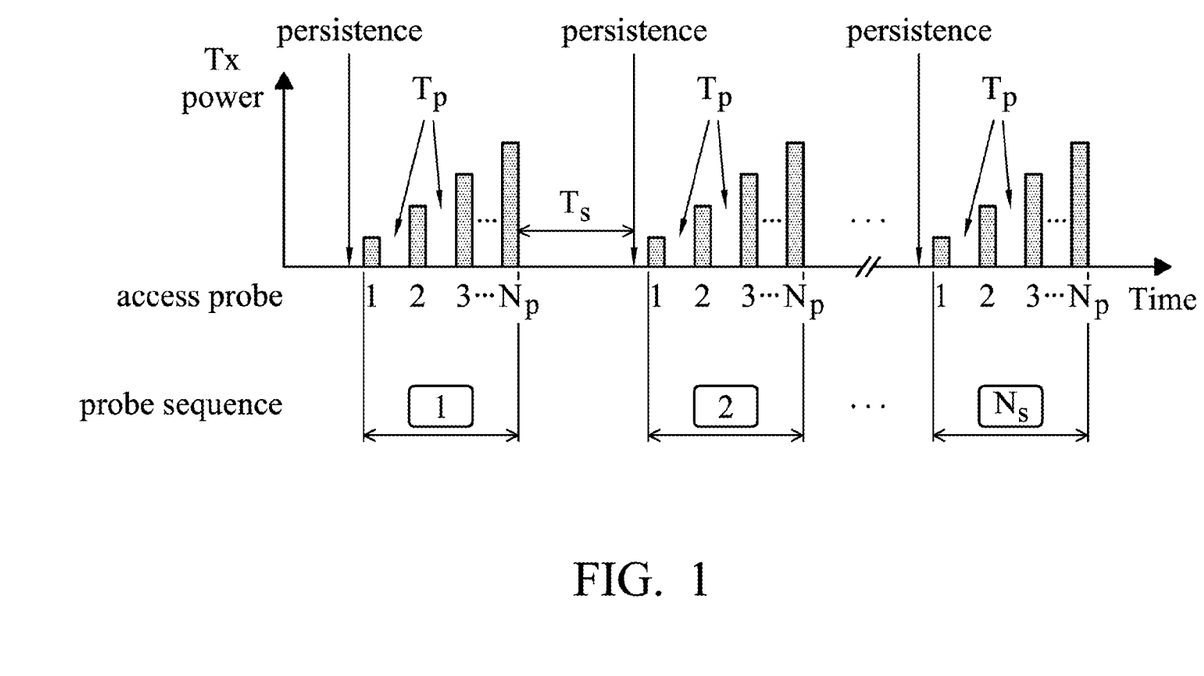
FIG. 1 is a block diagram illustrating a conventional access procedure of an M2M machine.

It is noted that the amount of data per report is usually small, so preferably, an access channel is used by most M2M machines to transmit the data traffic. FIG. 1 is a block diagram illustrating a conventional access procedure of an M2M machine. To begin, the M2M machine first performs a persistence check to see if another M2M machine is transmitting data on the access channel. If not, it transmits an access probe with an initial transmission power. Subsequently, the M2M machine waits for a response of the access probe for a period of time (denoted as $T_p$). If no response of the access probe is received during $T_p$, the M2M machine increases the transmission power and uses the increased transmission power to retransmit the access probe. During each probe sequence, the retransmission of the access probe is repeated using incremental transmission power until a response of the access probe is received or a maximum number of retries (denoted as $N_p$) is reached. If no response of the access probe is received during a probe sequence of retransmission, the M2M machine further holds for another period of time (denoted as $T_s$) and then initiates another probe sequence of retransmission. However, it is noted that the access channel is a shared common channel for all M2M machines in the same service area and too many retransmissions of the access probe may cause unnecessary occupancy over the access channel. That is, collision of access probes transmitted by different M2M machines may occur frequently and result in throughput degression for the entire M2M system.

In addition, when selecting an access network (referred to as AN herein) to initiate the access procedure, the conventional M2M machine only takes into account the pilot strength of the detected ANs, and transmits the access probe to the AN with the highest pilot strength. However, if the reverse-link (referred to as RL herein) load of the selected AN is heavy, the interference on the RL will be great. In this case, the delivery of the access probe is not only likely to fail, but also introduces more interference on the RL. Thus, it is desirable to have a novel access procedure in which the radio resources of the access channel may be efficiently utilized to improve the overall system throughput.

BRIEF SUMMARY OF THE INVENTION

Accordingly, embodiments of the invention provide apparatuses, systems, and methods for access procedure enhancement. In one aspect of the invention, a mobile communication device for access procedure enhancement is provided. The mobile communication device comprises a wireless module and a controller module. The wireless module performs wireless transmissions and receptions to and from a service network. The controller module transmits an access probe to the service network via the wireless module, and retransmits the access probe in response to not receiving an acknowledgement of the access probe from the service network via the wireless module in a waiting period of time. Also, the controller module further repeats the retransmission of the access probe until the acknowledgement of the access probe is received from the service network via the wireless module, wherein the waiting period of time is determined according to a coherence-time related offset.

In another aspect of the invention, a method for access procedure enhancement by a mobile communication device comprising a wireless module capable of wireless transmissions and receptions is provided. The method comprises the steps of transmitting an access probe to a service network via the wireless module, retransmitting the access probe in response to not receiving any acknowledgement of the access probe from the service network via the wireless module in a waiting period of time, wherein the waiting period of time is determined according to a coherence-time related offset, and repeating the retransmission of the access probe until an acknowledgement of the access probe is received from the service network via the wireless module.

In another aspect of the invention, a service network for access procedure enhancement is provided. The service network comprises a radio access network and a control node. The radio access network performs wireless transmissions and receptions to and from a mobile communication device. The control node receives an access probe from the mobile communication device via the radio access network, and determines whether the access probe indicates that a length of message data is less than a threshold. Also, the control node transmits a pre-acknowledgement of the access probe to the mobile communication device via the radio access network in response to the length of the message data being less than the threshold.

In another aspect of the invention, a mobile communication system for access procedure enhancement is provided. The mobile communication system comprises a mobile communication device and a service network. The mobile communication device transmits an access probe, retransmits the access probe in response to not receiving an acknowledgement of the access probe in a waiting period of time, and repeats the retransmission of the access probe until the acknowledgement of the access probe is received, wherein the waiting period of time is determined according to a coherence-time related offset. The service network transmits the acknowledgement of the access probe to the mobile communication device in response to receiving the access probe or the retransmitted access probe.

Other aspects and features of the invention will become apparent to those with ordinary skill in the art upon review of the following descriptions of specific embodiments of the mobile communication device, the service network, the mobile communication system, and the method for access procedure enhancement.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
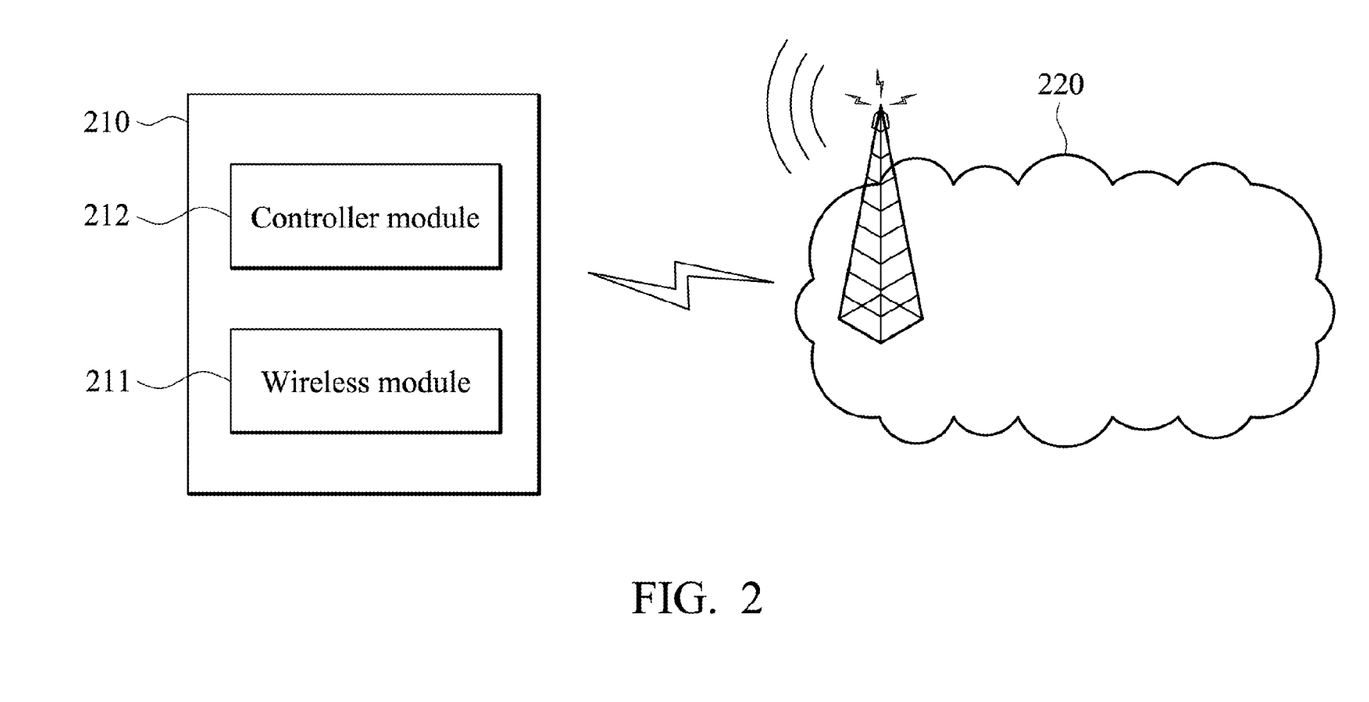
FIG. 2 is a block diagram illustrating a mobile communication system according to an embodiment of the invention.

FIG. 2 is a block diagram illustrating a mobile communication system according to an embodiment of the invention. In the mobile communication system 200, the mobile communication device 210 is wirelessly connected to the service network 220 via an air interface, and performs wireless transmissions and receptions to and from the service network 220. The mobile communication device 210 comprises a wireless module 211 for performing the functionality of wireless transmissions and receptions. To further clarify, the wireless module 211 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the radio access technology (RAT) in use. Also, the mobile communication device 210 comprises a controller module 212 for controlling the operation of the wireless module 211 and other function components, such as a display unit and/or keypad serving as the MMI (man-machine interface), a storage unit storing the program codes of applications or communication protocols, or others. To be more specific, the controller module 212 controls the wireless module 311 to perform an access procedure with the service network 220. The controller module 212 first transmits an access probe to the service network 220 via the wireless module 211, and then awaits an acknowledgement of the access probe from the service network 220 for a waiting period of time. Note that the waiting period of time is determined according to a coherence-time related offset. If no acknowledgement of the access probe is received from the service network 220 via the wireless module 211 in the waiting period of time, the controller module 212 retransmits the access probe to the service network 220 via the wireless module 211. Basically, the controller module 212 repeats the retransmission of the access probe until the acknowledgement of the access probe is received from the service network 220 via the wireless module 211. In addition to the wireless module 211 and the controller module 212, the mobile communication device 210 may contain other components, such as sensors for detecting temperature, pressure, vibration, and/or water line, according to the appliance of the mobile communication device 210. For example, the mobile communication device 210 may be a monitoring device coupled to/in a waterworks facility, bridge, electric meter, gas line device, coke machine, or others.

Figure 3:
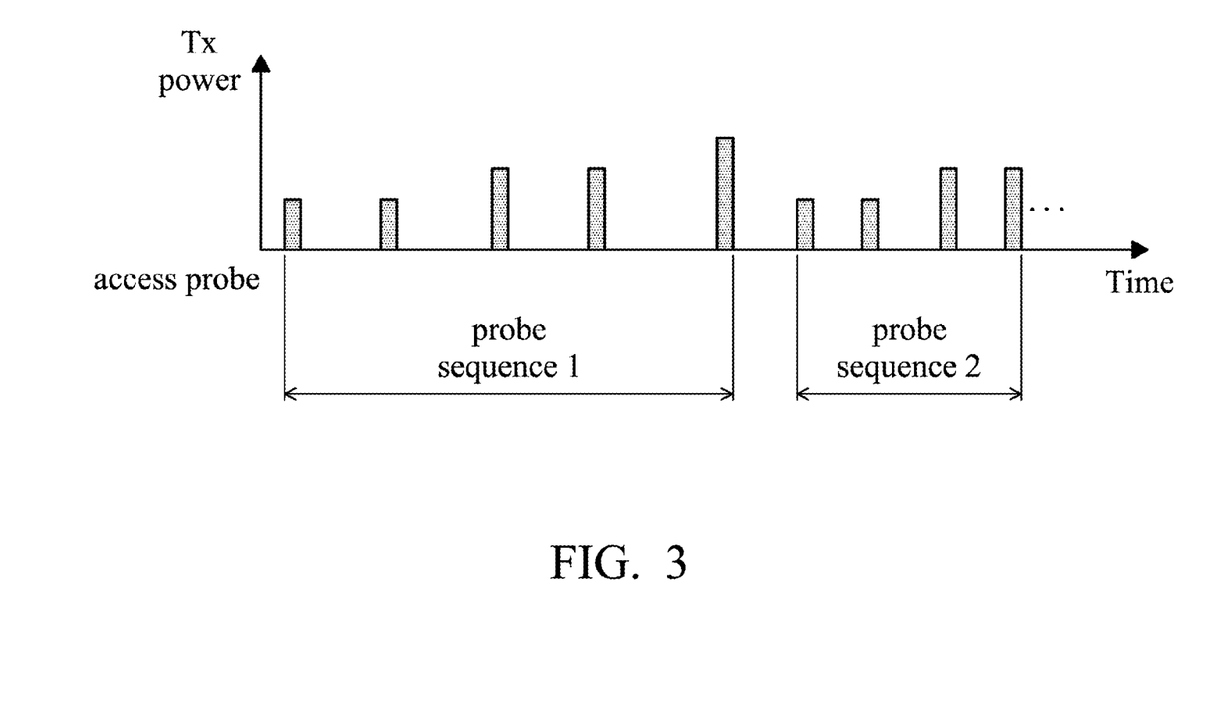
FIG. 3 is a schematic diagram illustrating the detailed operation of the mobile communication device 210 during an access procedure according to an embodiment of the invention.

FIG. 3 is a schematic diagram illustrating the detailed operation of the mobile communication device 210 during an access procedure according to an embodiment of the invention. Unlike the conventional design as described above, the waiting period of time between the transmissions/retransmissions of access probes (referred to as $T_p'$ herein) is extended in the access procedure to avoid access probe collisions since the traffic of M2M communications is usually delay insensitive. Specifically, the extension of the waiting period of time is determined by taking into account the coherence time for wireless transmissions between the mobile communication device 210 and the service network 220. In one embodiment, $T_p'$ may be derived from equation (1) as follows:

$$T_p' = T_{ACMPATProbeTimeout} + (y_{Total} \times AccessCycleDuration) - ProbeTimeOutAdjst + M2MOffset, \quad (1)$$

wherein $T_{ACMPATProbeTimeout}$ is the time for receiving the acknowledgement of the access probe, $y_{Total}$ is a uniformly distributed integer random number, AccessCycleDuration is the duration of an Access channel Cycle in units of slots, which specifies the time instants at which the access terminal may start transmitting/retransmitting an access probe, and ProbeTimeOutAdjust is the parameter to set the time-out adjustment of each access probe. Most importantly, in the equation (1), an additional time offset for M2M communications, i.e. M2MOffset, is introduced for the purpose of extending the waiting period of time. The value of M2MOffset may be configured in the range from 0 to 6.828 seconds, where the value is negotiable between the mobile communication device 210 and the service network 220 for ensuring that $T_p'$ is larger than the coherence time for wireless transmissions between the mobile communication device 210 and the service network 220. For example, the coherence time may be 0.667 seconds (derived from the Doppler Frequency Shift specified in the specification 3GPP2 C.R1002) for static M2M devices, and M2MOffset may be configured to a certain value so that $T_p'$ is larger than 0.667 seconds. In addition to the extension of the waiting period of time, the transmission power used to transmit/retransmit the access probe is further controlled in a way that the same transmission power is used for the first 2 transmission/retransmission of the access probe and then the transmission power is scaled up to a certain level for the next 2 retransmissions of the access probe in the same probe sequence, as shown in FIG. 3. The increment of the transmission power used is repeated until an acknowledgement of the access probe is received from the service network 220 or a maximum number of retries is reached. It is to be understood that 2 times of the same transmission power applied is just an example, and other number of times of the same transmission power applied may be contemplated for those skilled in the art. Note that, in the second probe sequence, a new waiting period of time is calculated by the equation (1) and the transmission power is reset to the initial level in the first probe sequence. With the extension of the waiting period of time, not only are collisions of access probes avoided, but also the mobile communication device 210 may get more time to measure the pilot strength. By averaging the long-measured pilot strength, a more accurate estimation of the pilot strength and received power may be obtained, so that the mobile communication device 210 may determine a more appropriate transmission power. In addition, the instant fast fading on the wireless links may be eliminated due to the extension of the waiting period of time.

Figure 4:
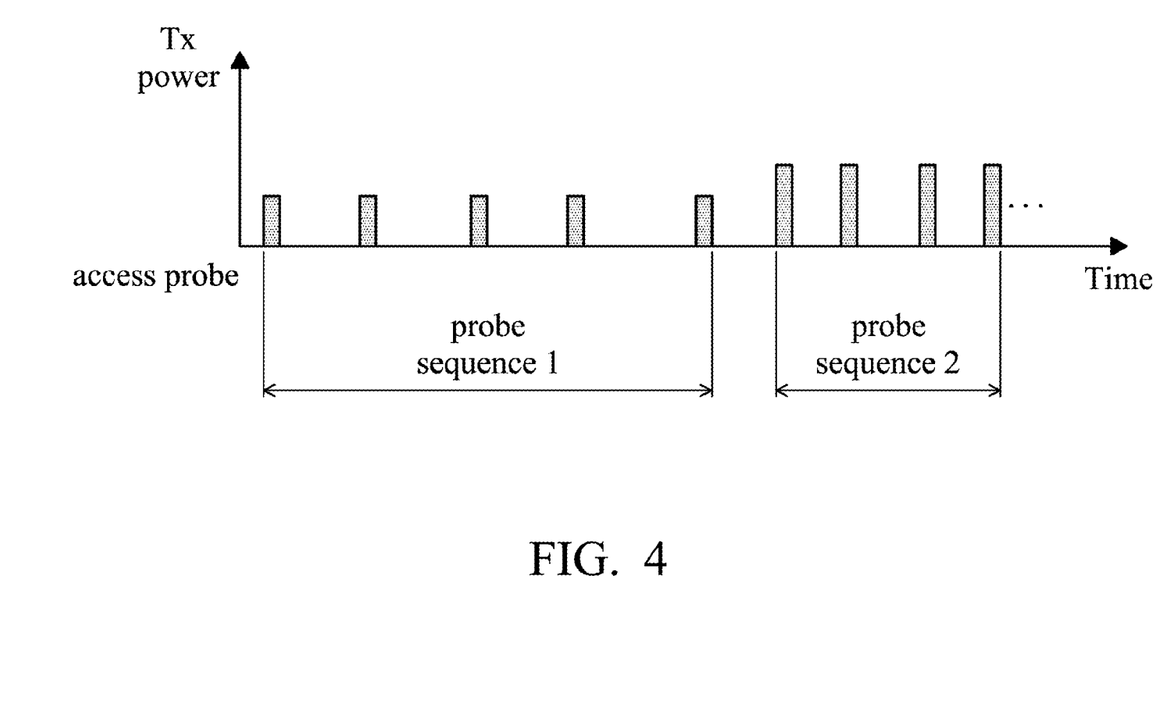
FIG. 4 is a schematic diagram illustrating the detailed operation of the mobile communication device 210 during an access procedure according to another embodiment of the invention.

FIG. 4 is a schematic diagram illustrating the detailed operation of the mobile communication device 210 during an access procedure according to another embodiment of the invention. Similar to FIG. 3, the waiting period of time between the transmissions/retransmissions of access probes is extended in the access procedure by adding an additional time offset as described above with the equation (1). However, as shown in FIG. 4, the transmission powers used for all transmission and retransmissions of the access probe in each probe sequence is set to the same level. Specifically, the transmission power used in the first probe sequence is set to an initial level, and the transmission power used in the second probe sequence is scaled up from to a certain level larger than the initial level, and so on. It is noted that the mobile communication device 210 further employs the open-loop power control for determining the initial transmission power used in each probe sequence.

Figure 5:
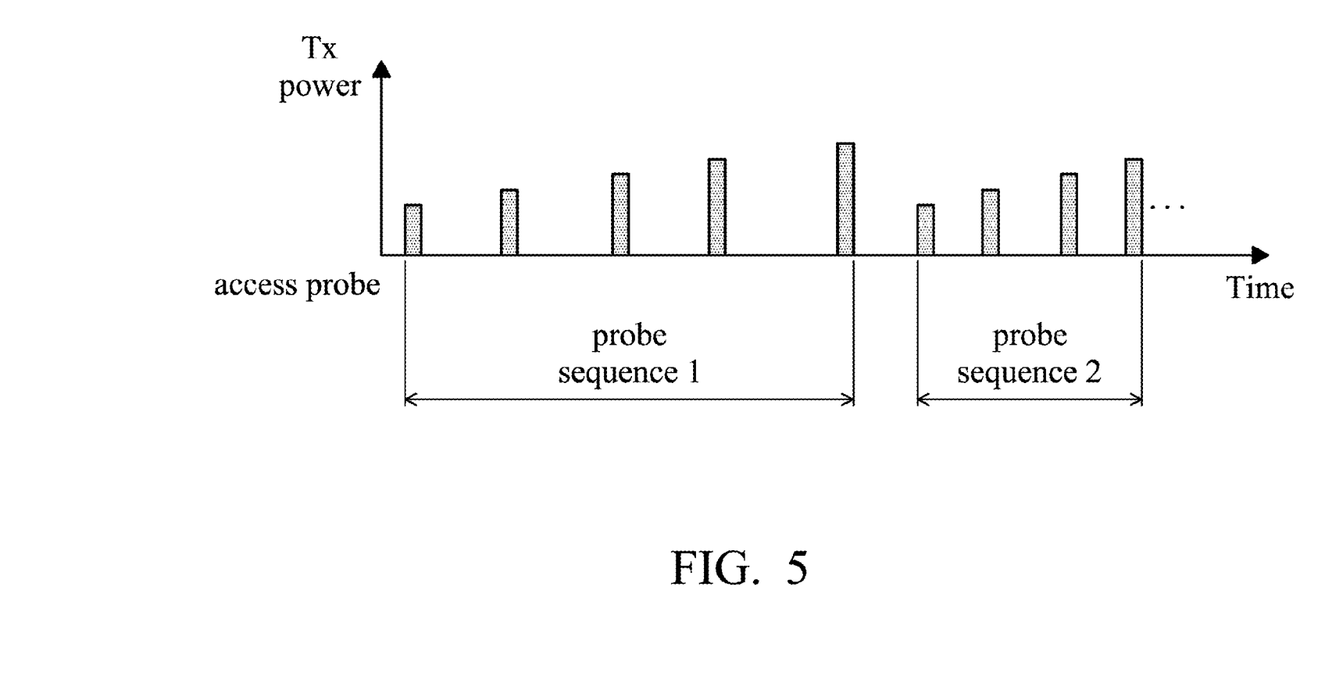
FIG. 5 is a schematic diagram illustrating the detailed operation of the mobile communication device 210 during an access procedure according to yet another embodiment of the invention.

FIG. 5 is a schematic diagram illustrating the detailed operation of the mobile communication device 210 during an access procedure according to yet another embodiment of the invention. Similar to FIGS. 3 and 4, the waiting period of time between the transmissions/retransmissions of access probes is extended in the access procedure by adding an additional time offset as described above with the equation (1). However, as shown in FIG. 5, the transmission power used is scaled up for every retransmission in each probe sequence. Specifically, in the first probe sequence, the waiting period of time is calculated by the equation (1) and the transmission power of the access probe is selected in an incremental manner, and in the second probe sequence, the waiting period of time is re-calculated by the equation (1) and the transmission power of the access probe is selected in the same incremental manner, and so on until an acknowledgement of the access probe is received or a maximum number of retries is reached. The maximum number of retries is a configurable parameter. In one embodiment, the maximum number of retries is determined by the broadcasted system information from the service network 220.

Figure 6:
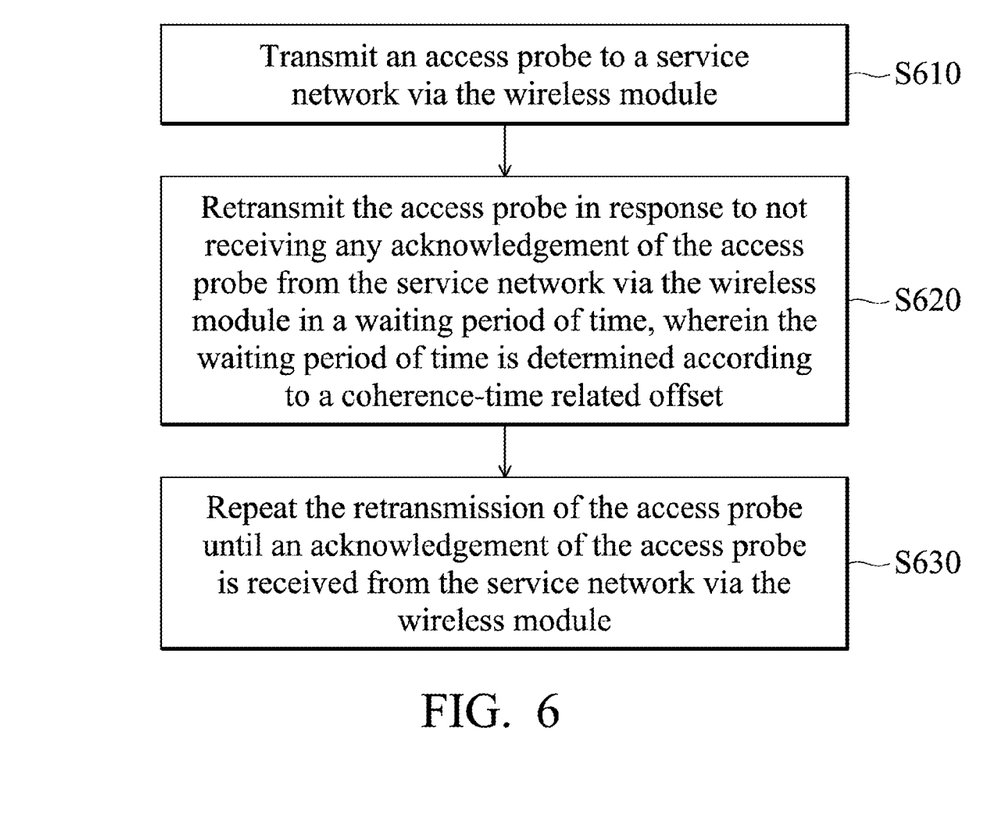
FIG. 6 is a flow chart illustrating the method for access procedure enhancement according to an embodiment of the invention.

FIG. 6 is a flow chart illustrating the method for access procedure enhancement according to an embodiment of the invention. In this embodiment, the method is applied to the mobile communication device 210. To begin, the mobile communication device 210 transmits an access probe to the service network 220 via the wireless module 211 (step S610). In response to not receiving any acknowledgement of the access probe from the service network 220 via the wireless module 211 in a waiting period of time, e.g. $T_p'$, the mobile communication device 210 retransmits the access probe to the service network 220 via the wireless module 211, wherein the waiting period of time is determined according to a coherence-time related offset (step S620). In one embodiment, the coherence-time related offset may be the parameter M2MOffset, as described in FIG. 3, considering the coherence time for wireless transmissions between the mobile communication device 210 and the service network 220. Subsequently, the mobile communication device 210 repeats the retransmission of the access probe until an acknowledgement of the access probe is received from the service network 220 via the wireless module 211 (step S630). Note that the waiting period of time is extended when compared with the conventional access procedure to avoid access probe collisions. In addition to the extension of the waiting period of time, the method further adjusts the transmission power for the retransmissions of the access probe. In one embodiment, the access probe may be first transmitted using a transmission power and then the same transmission power is used for a predetermined number of retransmissions within a probe sequence. Taking the example shown in FIG. 3, the predetermined number of retransmissions is set to 1. Later, if the acknowledgement of the access probe is not yet received from the service network 220, the method may further enable the mobile communication device 210 to increase the transmission power for the next 2 retransmissions of the access probe within the same probe sequence. The increment of the transmission power may be performed repeatedly until the acknowledgement of the access probe is not yet received. In another embodiment, the method may enable the mobile communication device 210 to use the same transmission power of the first transmission for all the retransmissions within a probe sequence and increase the transmission power for the retransmissions within a next probe sequence, as described with respect to FIG. 4. Alternatively, in yet another embodiment, the method may enable the mobile communication device 210 to increase the transmission power for each transmission/retransmission of the access probe within a probe sequence, as described with respect to FIG. 5. Note that the mobile communication device 210 is operating in non-slotted mode where continuous monitoring of the paging channel is required, and the wireless technology used for the communications between the mobile communication device 210 and the service network 220 is 1×HRPD Rev. C, while other wireless technologies, such as the GSM/GPRS, UMTS, 1×CDMA 2000, and LTE, may be employed as well without departing from the spirit of the invention.

In order to enhance the throughput of M2M communications, when selecting a target AN (assuming that the service network 220 further comprises a plurality of ANs) to initiate an access procedure, the mobile communication device 210 takes into account not only the pilot strength of the ANs but also the RL load information of the ANs. In one embodiment, the ANs in the service network 220 may each broadcast its RL load information to the mobile communication device 210. The RL load information may comprise an RL load level, referred to as $\mu_{(p,t)}$, for each neighboring AN's pilot p for all carriers at time t, a minimum server quality γ or a minimum transmission power headroom, and an RL open-loop adjust value for open-loop power control. Based on the RL load information, the mobile communication device 210 may first select the ANs having the highest value of $SINR_{(p,t)} - \mu_{(p,t)}$. Subsequently, the mobile communication device 210 selects one target AN with the lightest RL load to initiate the access procedure. In this way, the access procedure may be performed in a fair-quality AN with light RL load, so M2M communications between the mobile communication device 210 and the service network 220 will be smooth.

It is noted that the open-loop power control employed for determining the initial transmission of the access probe in each probe sequence is further enhanced by the mobile communication device 210. Specifically, the mobile communication device 210 determines the initial transmission of the access probe in each probe sequence according to the RL load status of the target AN. The RL load status of the target AN may be obtained from the broadcasted system information from the target AN, or from the Reverse Activity Bit (RAB) indicated in MAC index 4. The Reverse Activity Bit is transmitted to indicate the load status on reverse link. Based on this information, the terminal can change its data rate on the reverse link. The mobile communication device 210 first determines an additional adjustment factor, denoted as LoadAdjust, according to the RL load status of the target AN, and then determines the mean output power for the open-loop power control with the equation as follows:

$$\text{Initial\_TxPower} = -\text{MeanRxPower} + \text{OpenLoopAdjust} + \text{ProbeInitialAdjust} + \text{LoadAdjust}, \quad (2)$$

wherein MeanRxPower is the mean estimation of received power, OpenLoopAdjust is the nominal power to be used by the access terminal in open loop power control, and ProbeInitialAdjust is a correction factor to be used by the access terminal in open loop power control. Both OpenLoopAdjust and ProbeInitialAdjust are specified in an AccessParameters message. Note that the adjustment factor, LoadAdjust, may be calculated by the mobile communication device 210 according to the broadcasted system information or the RAB, or the mobile communication device 210 may maintain a mapping table describing the mapping relationship between the RL load status and the adjustment factor, LoadAdjust. Alternatively, the ANs in the service network 220 may include the adjustment factor, LoadAdjust, together with the RL load status in the broadcasted system information.

Figure 7:
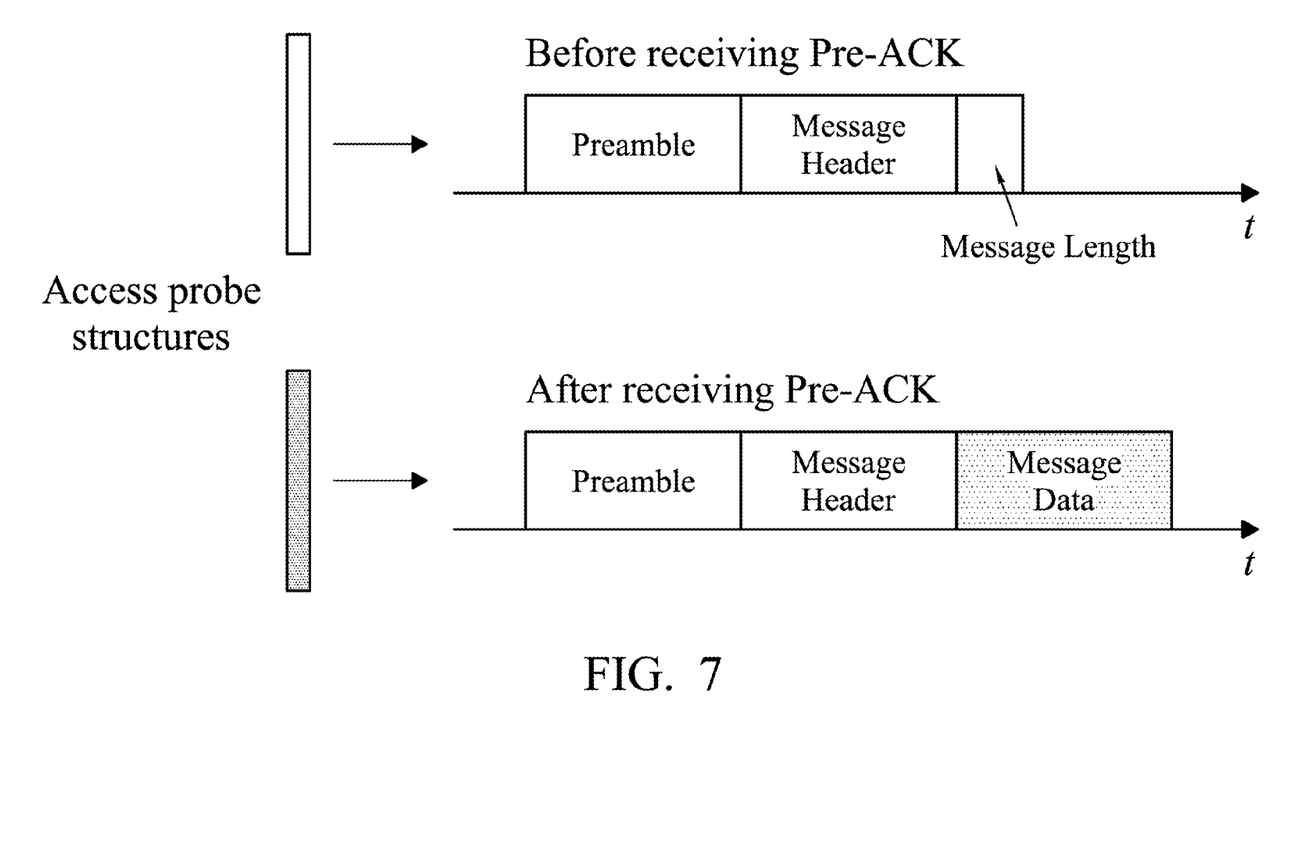
FIG. 7 is a schematic diagram illustrating the structures of the access probe before and after receiving a pre-acknowledgement according to an embodiment of the invention.
Figure 8:
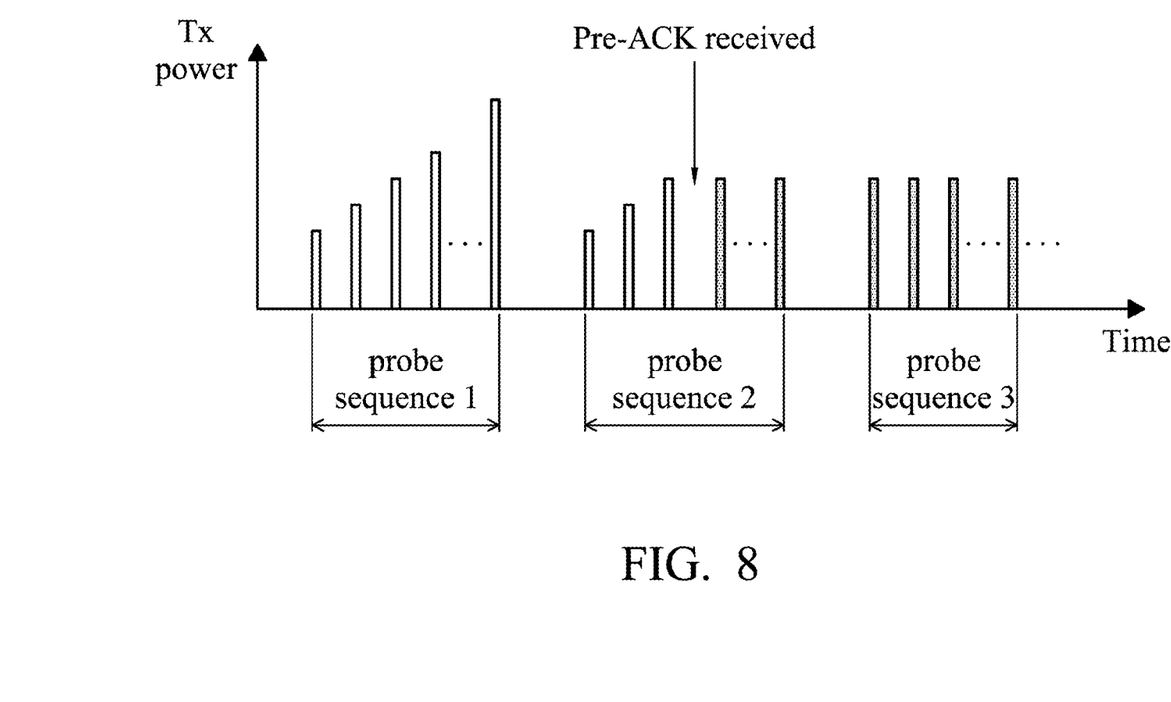
FIG. 8 is a schematic diagram illustrating the detailed operation of the mobile communication device 210 during an access procedure according to the embodiment of FIG. 7.

In addition, a pre-acknowledgement mechanism is provided to improve the reduction in interference on the access channel. That is, by transmitting a pre-acknowledgement of the received access probe, the service network 220 may indicate to the mobile communication device 210 that the service network 220 has detected the preamble or decoded the header part of the received access probe. Thus, a different structure of the access probe may be employed by the mobile communication device 210. FIG. 7 is a schematic diagram illustrating the structures of the access probe before and after receiving a pre-acknowledgement according to an embodiment of the invention. Before receiving a pre-acknowledgement from the service network 220, the mobile communication device 210 may only include the preamble, the message header, and the message length in the access probe (denoted with a white bar as shown in the upper half of FIG. 7) without the message data. This would shorten the duration of access probe and reduce possible interference on the access channel. When receiving the access probe, the service network 320 may determine whether to transmit a pre-acknowledgement or set up a traffic channel for the mobile communication device 210 according to the message length. For example, if the message length indicates that a large amount of data is to be transmitted, the service network 220 may determine to set up a traffic channel for the mobile communication device 210 since the access channel is more appropriate for transmitting small amounts of data. Otherwise, if the message length indicates that a small amount of data is to be transmitted, the service network 220 may determine to transmit a pre-acknowledgement to the mobile communication device 210. After receiving the pre-acknowledgement from the service network 220, the mobile communication device 210 may instead include the preamble, the message header, and the message data in the access probe (denoted with a gray bar as shown in the lower half of FIG. 7). Since receiving the pre-acknowledgement may imply that the service network 220 is able to detect the preamble or decode the message header in the access probe, the transmission power used for the access probe may be enough for the delivery of the access probe. Thus, the transmission power used for the pre-acked access probe may be used for all the subsequent retransmissions of the access probe, as shown in FIG. 8.

Figure 9:
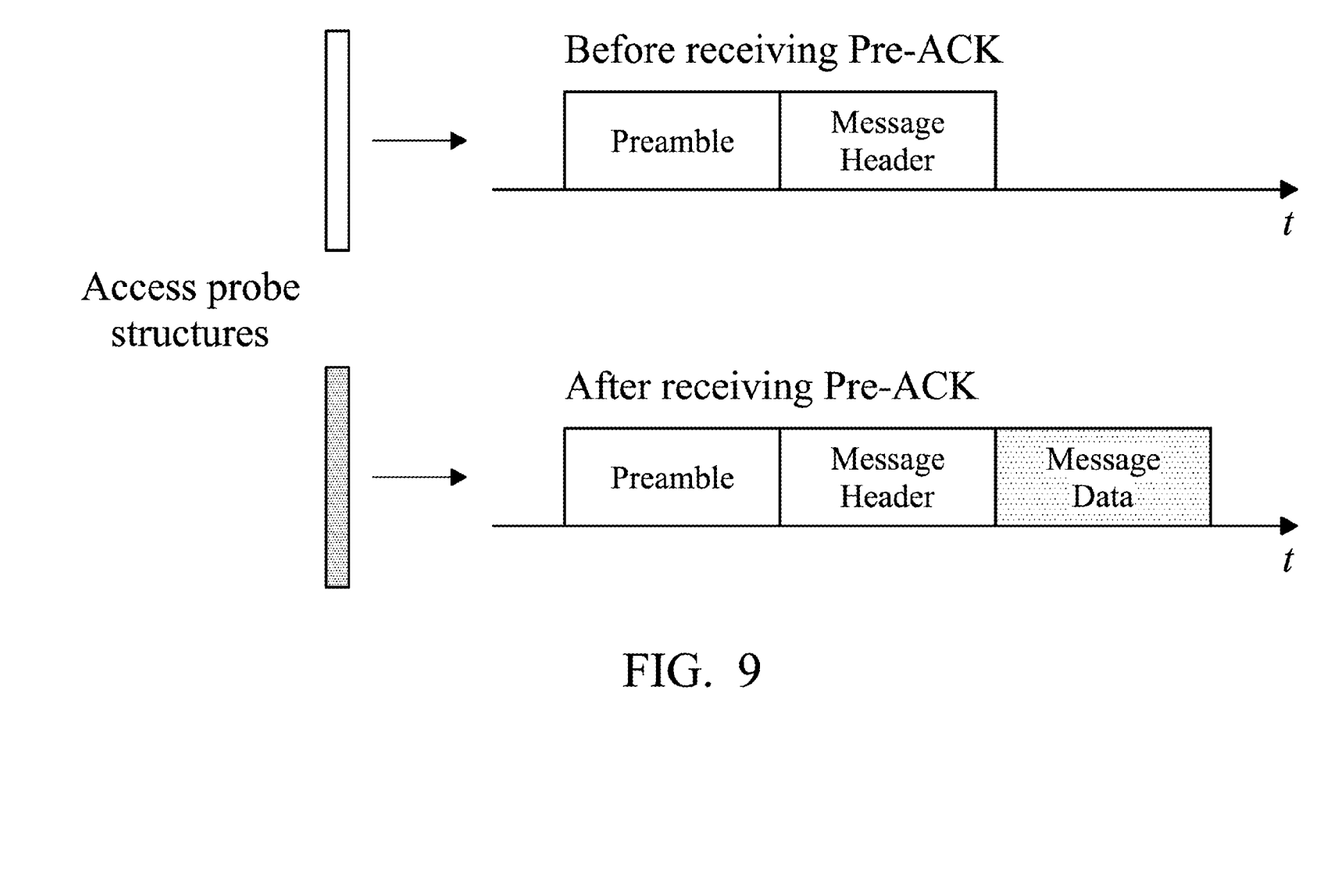
FIG. 9 is a schematic diagram illustrating the structures of the access probe before and after receiving a pre-acknowledgement according to another embodiment of the invention.
Figure 10:
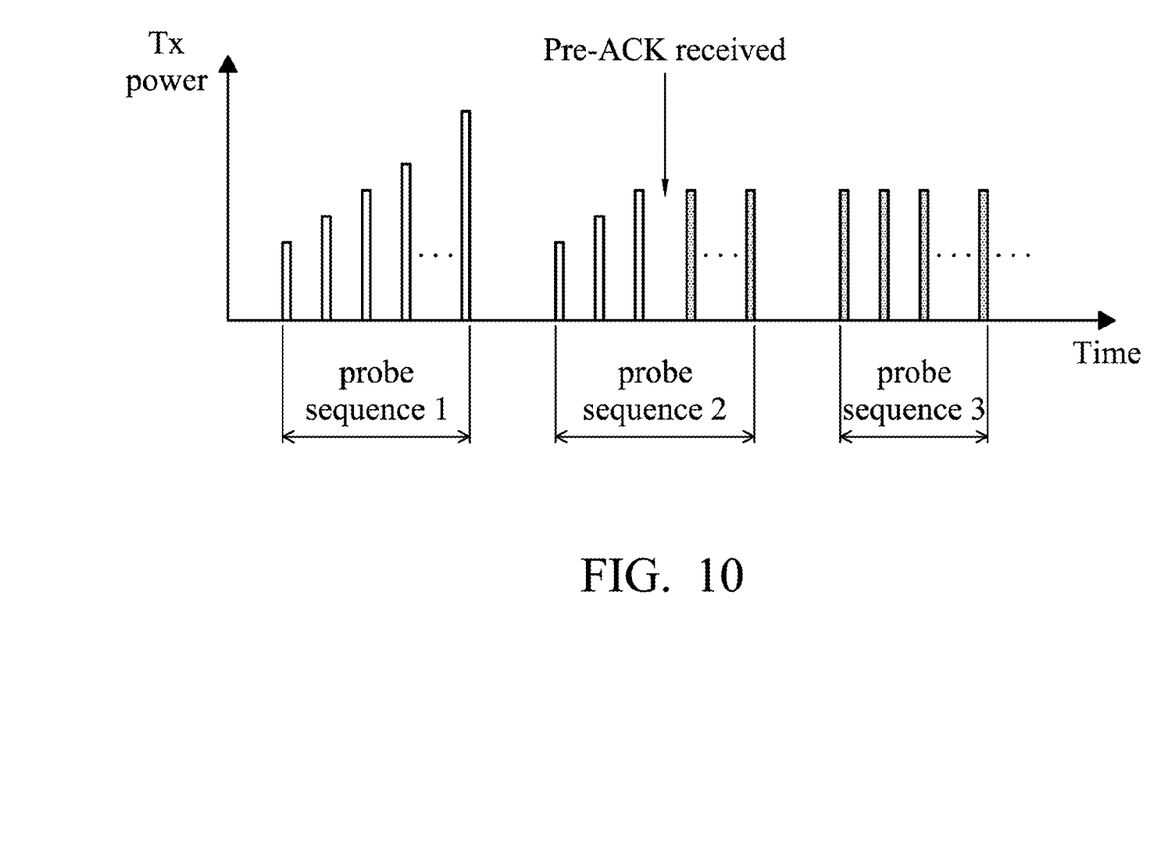
FIG. 10 is a schematic diagram illustrating the detailed operation of the mobile communication device 210 during an access procedure according to the embodiment of FIG. 9.
Figure 11:
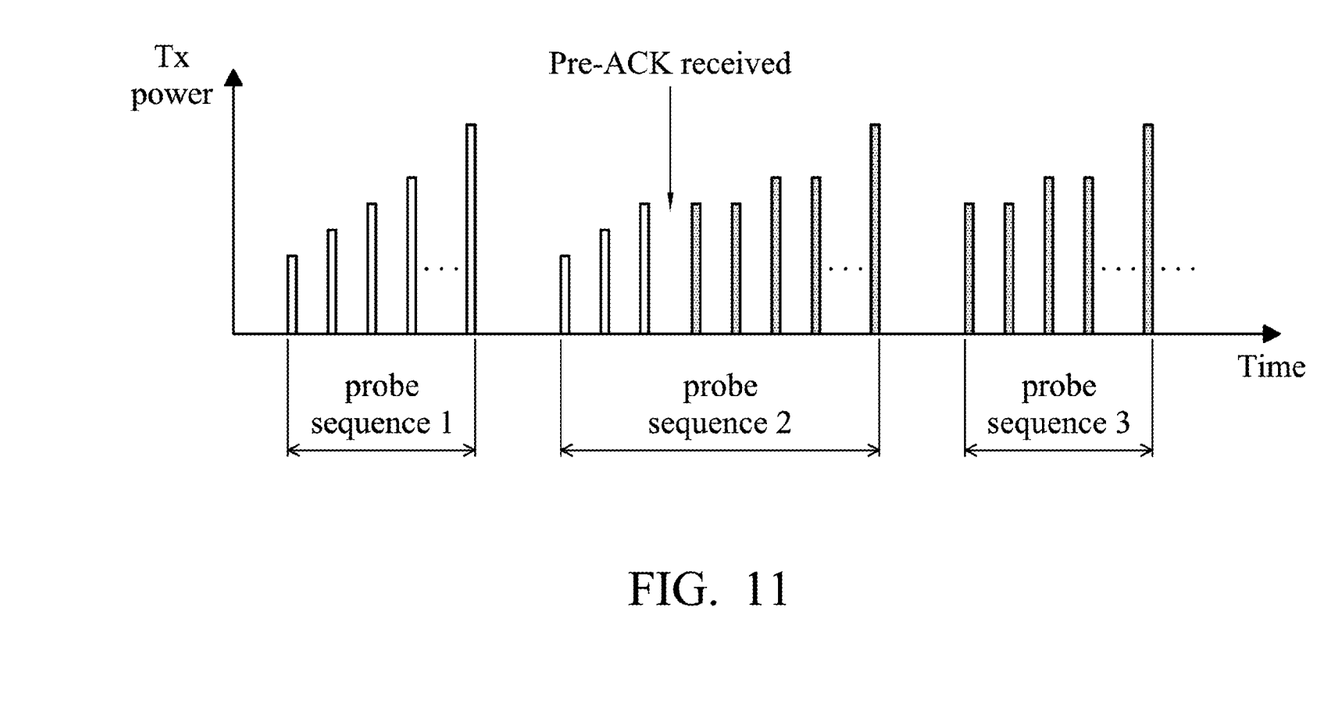
FIG. 11 is another schematic diagram illustrating the detailed operation of the mobile communication device 210 during an access procedure according to the embodiment of FIG. 9.

FIG. 9 is a schematic diagram illustrating the structures of the access probe before and after receiving a pre-acknowledgement according to another embodiment of the invention. Before receiving a pre-acknowledgement from the service network 220, the mobile communication device 210 may only include the preamble and the message header in the access probe (denoted with a white bar as shown in the upper half of FIG. 10) without the message data, wherein the message header further comprises the message length. When receiving the access probe, the service network 320 may determine whether to transmit a pre-acknowledgement or set up a traffic channel for the mobile communication device 210 according to the message length, as described above. After receiving the pre-acknowledgement from the service network 220, the mobile communication device 210 may instead include the preamble, the message header, and the message data in the access probe (denoted with a gray bar as shown in the lower half of FIG. 10), wherein the message header may or may not comprise the message length. Since receiving the pre-acknowledgement may imply that the service network 220 is able to detect the preamble or decode the message header in the access probe, the transmission power used for the access probe may be enough for the delivery of the access probe. Thus, the transmission power used for the pre-acked access probe may be used for all the subsequent retransmissions of the access probe, as shown in FIG. 10. Alternatively, the transmission power used for the pre-acked access probe may be used for only a predetermined number of the subsequent retransmissions, and after that, the transmission power may be scaled up for the next predetermined number of the subsequent retransmissions, as shown in FIG. 11, until an acknowledgement of the access probe is received from the service network 220 or the maximum number of retries is reached. Note that the initial transmission power for the retransmissions in the probe sequence after the pre-acknowledgement is received may be set to the same transmission power used for the pre-acked access probe.

In yet another embodiment, the mobile communication device 210 may always include the entire message packet in the access probe. When detecting the preamble of the access probe, the service network 220 may broadcast a pre-acknowledgement to all mobile communication devices to indicate that a non-decodable access probe has been received, so that other mobile communication devices may change their access timing of the next access probes to avoid collisions and reduce interference on the access channel.

While the invention has been described by way of example and in terms of preferred embodiment, it is to be understood that the invention is not limited thereto. Those who are skilled in this technology can still make various alterations and modifications without departing from the scope and spirit of this invention. For example, the wireless technology employed by the mobile communication device 210 and the service network 220 may be the GSM/GPRS, UMTS, 1×CDMA 2000, or LTE technology. Therefore, the scope of the invention shall be defined and protected by the following claims and their equivalents.

What is claimed is:

1. A service network for access procedure enhancement, comprising:
a radio access network configured to perform wireless transmissions and receptions to and from a mobile communication device; and
a control node configured to:
receive a first access probe comprising a data length corresponding to a length of a message data from the mobile communication device via the radio access network,
determine whether the first access probe is decodable in response to detecting a preamble in the first access probe;
transmit a first pre-acknowledgement of the first access probe to the mobile communication device via the radio access network in response to determining that the length of the message data is less than a threshold and based on the determined decodability of the first access probe, and
after transmitting the first pre-acknowledgement of the first access probe, receive a second access probe comprising the message data from the mobile communication device via the radio access network, the message data replacing the data length of the message data to generate the second access probe received from the mobile communication device,
wherein the control node is further configured to broadcast a second pre-acknowledgement with information of the first access probe via the radio access network in response to determining that the first access probe is non-decodable.

2. The service network of claim 1, wherein the control node is further configured to:
transmit an acknowledgement of the second access probe to the mobile communication device via the radio access network.

3. The service network of claim 1, wherein the control node is further configured to broadcast information concerning reverse-link load information of the service network to the mobile communication device via the radio access network.

4. The service network of claim 3, wherein the reverse-link load information comprises:
a reverse-link load level;
a minimum server quality or a minimum transmission power headroom; and/or
a reverse-link open-loop adjust value for open-loop power control.

5. The service network of claim 1, wherein a transmission power associated with the second access probe is determined based on a transmission power associated with the first access probe.

6. The service network of claim 5, wherein the transmission power associated with the second access probe is further determined based on the first pre-acknowledgement of the first access probe.

7. The service network of claim 5, wherein the transmission power associated with the second access probe is the same as the transmission power associated with the first access probe.

8. The service network of claim 1, wherein a transmission power associated with the second access probe is determined based on a transmission power associated with the first access probe and the first pre-acknowledgement of the first access probe, the transmission power associated with the second access probe being the same as the transmission power associated with the first access probe.

9. A method for access procedure enhancement by a service network comprising a radio access network, comprising:
receiving a first access probe comprising a data length corresponding to a length of a message data from a mobile communication device via the radio access network;
determining whether the first access probe is decodable in response to detecting a preamble in the first access probe;
determining whether the first access probe indicates that the length of message data is less than a threshold;
transmitting a first pre-acknowledgement of the first access probe to the mobile communication device via the radio access network in response to the length of the message data being less than the threshold and based on the determined decodability of the first access probe;

after transmitting the first pre-acknowledgement of the first access probe, receiving a second access probe with the message data from the mobile communication device via the radio access network, the message data replacing the data length of the message data to generate the second access probe received from the mobile communication device; and broadcasting a second pre-acknowledgement with information of the first access probe via the radio access network in response to determining that the first access probe is non-decodable.

10. The method of claim 9, further comprising:

transmitting an acknowledgement of the second access probe to the mobile communication device via the radio access network.

11. The method of claim 9, further comprising broadcasting information concerning reverse-link load information of the service network to the mobile communication device.

12. The method of claim 11, wherein the reverse-link load information comprises:

a reverse-link load level;

a minimum server quality or a minimum transmission power headroom; and/or a reverse-link open-loop adjust value for open-loop power control.

* * * * *